United States Patent
Bauer et al.

(10) Patent No.: US 12,374,958 B2
(45) Date of Patent: Jul. 29, 2025

(54) CAGE ROTOR WITH SUPPORT ELEMENT

(71) Applicant: Innomotics GmbH, Nuremberg (DE)

(72) Inventors: Christian Bauer, Gnotzheim (DE);
Konrad Brandl, Thalmassing (DE);
Markus Klöpzig, Ebermannstadt (DE);
Klaus Schleicher, Nuremberg (DE)

(73) Assignee: Innomotics GmbH, Nuremberg (DE)

( * ) Notice: Subject to any disclaimer, the term of this patent is extended or adjusted under 35 U.S.C. 154(b) by 201 days.

(21) Appl. No.: 17/777,426

(22) PCT Filed: Nov. 4, 2020

(86) PCT No.: PCT/EP2020/080953
§ 371 (c)(1),
(2) Date: May 17, 2022

(87) PCT Pub. No.: WO2021/099118
PCT Pub. Date: May 27, 2021

(65) Prior Publication Data
US 2022/0399790 A1 Dec. 15, 2022

(30) Foreign Application Priority Data
Nov. 18, 2019 (EP) .................................... 19209725

(51) Int. Cl.
*H02K 7/14* (2006.01)
*H02K 9/04* (2006.01)
*H02K 17/20* (2006.01)

(52) U.S. Cl.
CPC ................ *H02K 7/14* (2013.01); *H02K 9/04* (2013.01); *H02K 17/20* (2013.01)

(58) Field of Classification Search
CPC ........... H02K 17/165; H02K 7/14; H02K 9/04
(Continued)

(56) References Cited

U.S. PATENT DOCUMENTS 1,823,337 A * 9/1931 Sheely .................. H02K 17/168
310/212
4,139,790 A * 2/1979 Steen ...................... H02K 21/46
310/212

(Continued)

FOREIGN PATENT DOCUMENTS

DE 199 27 279 41 3/2000
DE 10 2013 202 403 A1 8/2014

(Continued)

OTHER PUBLICATIONS

Machine translation of Lange DE 19927279; Mar. 16, 2000.*

(Continued)

*Primary Examiner* — Terrance L Kenerly
(74) *Attorney, Agent, or Firm* — Henry M. Feiereisen LLC

(57) ABSTRACT

A cage rotor of an asynchronous machine includes a magnetically conductive body having substantially axially running slots with conductors connected to end faces of the magnetically conductive body in an electrically conductive manner by short circuit rings. The short circuit rings have an outer side, an inner side, a front side, and a rear side. A supporting element made of a high-strength material is located at least radially within the short circuit rings, i.e. on the inner face, with the supporting element being connected to the short-circuit ring, at least in one section, with a material fit.

14 Claims, 6 Drawing Sheets

(58) Field of Classification Search
USPC .......................................................... 310/211
See application file for complete search history.

(56) References Cited

U.S. PATENT DOCUMENTS

| | | |
|---|---|---|
| 5,495,133 A | 2/1996 | Bawin et al. |
| 2005/0073216 A1 | 4/2005 | Mitcham |
| 2013/0187511 A1 | 7/2013 | Lipot |

FOREIGN PATENT DOCUMENTS

| | | |
|---|---|---|
| EP | 1 821 348 A2 | 4/2005 |
| EP | 2 549 630 A1 | 1/2013 |
| RU | 81010 U1 | 2/2009 |
| RU | 2366201 C2 | 4/2010 |
| WO | WO 2015-188885 A1 | 12/2015 |
| WO | WO 2015188958 A1 | 12/2015 |

OTHER PUBLICATIONS

PCT International Search Report and Written Opinion of International Searching Authority mailed Sep. 12, 2020 corresponding to PCT International Application No. PCT/EP2020/080953 filed Apr. 11, 2020.

* cited by examiner

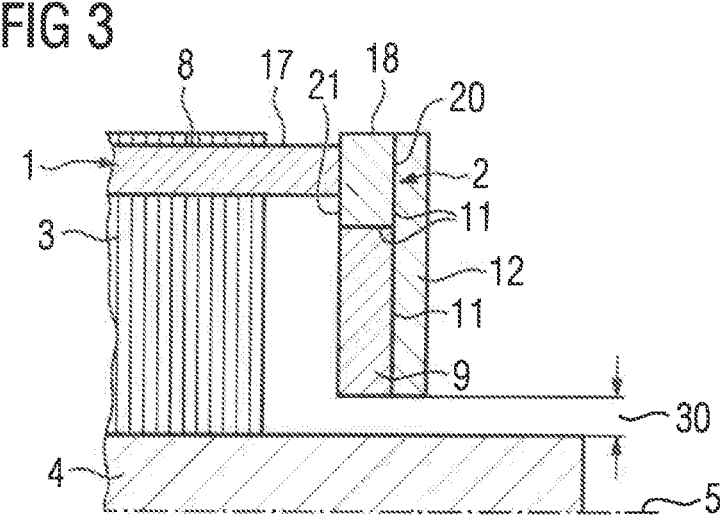
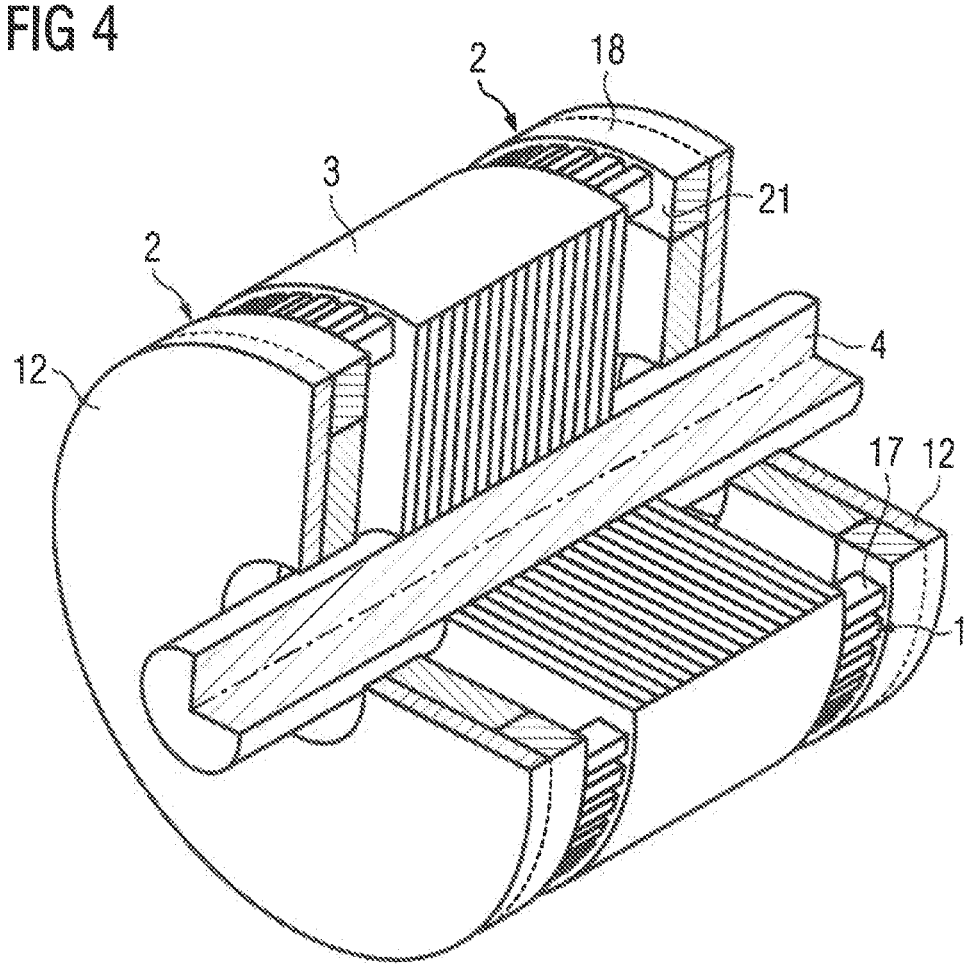

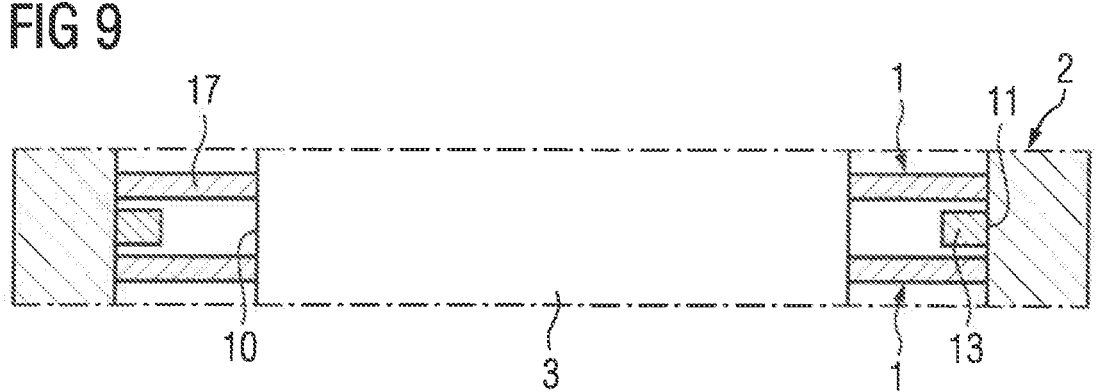
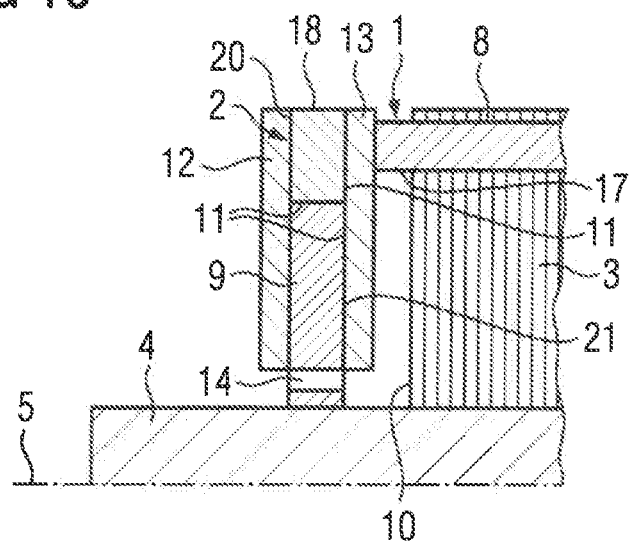

CAGE ROTOR WITH SUPPORT ELEMENT

CROSS-REFERENCES TO RELATED APPLICATIONS

This application is the U.S. National Stage of International Application No. PCT/EP2020/080953, filed Nov. 4, 2020, which designated the United States and has been published as International Publication No. WO 2021/099118 A1 and which claims the priority of European Patent Application, Serial No. 19209725.1, filed Nov. 18, 2019, pursuant to 35 U.S.C. 119 (a)-(d).

BACKGROUND OF THE INVENTION

The invention relates to a cage rotor with and without permanent magnets, an asynchronous machine with a cage rotor of this kind and the applications thereof.

Cage rotors of asynchronous machines have a laminated core with electrical conductors located therein and short-circuit rings on the end faces of the laminated core. The short-circuit rings of these cage rotors of the asynchronous machines are manufactured from materials/metal alloys with high electrical conductivity, for electromagnetic reasons. With regard to their mechanical strength, these materials restrict the rotational speeds of the rotor and the centrifugal forces on this short-circuit ring which result therefrom.

The rotational speed limits predefined by the material (aluminum, copper, copper alloys) lie at approx. 5000 rpm, depending on the shaft height. In other words, the rotational speed limits are determined by the path velocity and the centrifugal force load associated therewith.

The short-circuit rings are manufactured from a homogeneous material with low specific electrical resistance.

In order to reinforce the short-circuit ring, in some designs a retaining ring is provided on a turned shoulder of the outer diameter of the short-circuit ring.

Due to the air gap diameter or the stator bore of the stator, dimensions, in particular the outer diameter, of these retaining rings are also restricted for installation reasons.

SUMMARY OF THE INVENTION

The invention is therefore based on the object of providing a cage rotor of an asynchronous machine, which is also suitable for comparatively greater shaft heights and high rotational speeds above 8000 rpm. In this context, the cage rotor should also be designed for correspondingly high path velocities.

The object set is also achieved by a cage rotor of an asynchronous machine with a magnetically conductive body, in particular a laminated core, which has substantially axially running slots with conductors, which are connected in an electrically conductive manner to the end faces of the magnetically conductive body by means of short-circuit rings, wherein the short-circuit rings have an outer side, an inner side, a front side and a rear side, wherein located at least radially within the short-circuit rings, i.e. on the inner side, is a supporting element made of high-strength material, which is connected to the short-circuit ring at least in sections with a material fit.

The supporting element is primarily used to absorb the centrifugal forces, without protruding into an air gap of an asynchronous machine. This is achieved by the supporting element being connected to the short-circuit ring, at least at predefined sections on the inner side of the short-circuit ring, with a material fit to the short-circuit ring.

The supporting element is made of mechanically high-strength material, which due to its comparatively poor electrical conductivity is not used and suitable to guide a current, but instead is primarily provided for absorbing the centrifugal forces of the short-circuit ring during operation of the asynchronous machine.

In this context, "material-fit connection" is understood to mean welding, such as electron beam welding or hot isostatic pressing (HIP) or soldering, for example. The short-circuit ring and the supporting element should be held together in a non-detachable manner by way of atomic or molecular forces.

The electrically conductive ring, which therefore normally lies radially further on the outside and is made of copper, a comparatively high-strength copper alloy or another material with good electrical conductivity for guiding the current, forms the short-circuit ring.

Located at least on the radial inner side of the short-circuit ring is the supporting element, which at least in sections—when viewed axially and/or in the peripheral direction—is connected to the inner side of the short-circuit ring with a material fit.

In its basic shape, the supporting element is geometrically embodied as a ring or perforated disk, wherein the outer side thereof is connected to the inner side of the short-circuit ring with a material fit.

The supporting element may also be embodied as triangular, quadrangular, pentagonal etc. with regard to its basic shape. The material-fit connections are then provided in the respective corner points.

On each end face of the magnetically conductive body, in one specific embodiment, thus according to the invention, there are two concentric rings of different materials which in particular are interconnected with a material fit. Therefore, radially within the electrically conductive short-circuit ring there is a ring made of steel, in particular non-magnetic or made of another material with a high mechanical strength, for relieving the peripheral stresses on the outer ring, i.e. the short-circuit ring.

Alternatively, a ring made of a magnetic material with a high mechanical strength for relieving the peripheral stresses on the outer ring, i.e. the short-circuit ring, may also be provided radially within the electrically conductive short-circuit ring.

It is crucial that the outer ring, i.e. the short-circuit ring, substantially guides the current and only absorbs or is able to absorb centrifugal forces to a lesser extent, while the supporting element, i.e. the inner ring for example, is exclusively provided for stabilization and absorbing centrifugal forces, in particular in the high rotational speed range at high path velocities.

The inner ring, which may also be referred to as supporting ring, normally has an axial thickness which corresponds to the axial thickness of the short-circuit ring, in particular on the inner side. The supporting ring may also, however, be embodied with a larger or smaller axial extension. This depends inter alia upon the centrifugal force loads to be absorbed during operation of the asynchronous machine. The supporting ring may also be embodied in the shape of a plate ring, by upper and lower antinodes being located over the radial course.

In order to obtain an increase in the supporting effect that goes further beyond this, on the front side of the short-circuit ring and/or on the rear side of the short-circuit ring the supporting element has additional disk-shaped elements and/or radial extensions (struts and/or claw stars, which at least in sections are likewise connected to the short-circuit ring with a material fit. The supporting element may therefore be constructed in one piece or also in a modular manner, wherein the individual modules are likewise interconnected with a material fit.

These disk-shaped elements and/or radial extensions may extend up to the air gap of the asynchronous machine, in order to obtain additional centrifugal force relief for the short-circuit ring.

These radial extensions, preferably on the rear side of the short-circuit ring, may also be embodied as claw stars or as struts, in order to therefore also extend between the conductors protruding from the laminated core.

In particular, the claws of the claw star or the struts may also act as radial fans and thus improve the cooling of the cage rotor. In this context, it is possible for the claws or struts to extend radially, but also for the claws or struts to run obliquely thereto, in order to improve the radial fan effect.

An embodiment with a supporting element and a claw star arranged on one or both sides is also possible, i.e. on the front and/or rear side of the short-circuit ring. The claws of the claw star may be embodied as radially short or radially long. The advantage of the short embodiment may be the simpler manufacturing. A combination of short and long claws on one side of the short-circuit ring is likewise possible.

An embodiment with a supporting element and struts arranged on one or both sides is also possible, i.e. on the front and/or rear side of the short-circuit ring. The struts of the claw star may be embodied as radially short or radially long. A combination of short and long struts on one side of the short-circuit ring is likewise possible.

In order to avoid a possible imbalance of the cage rotor, the hybrid ring, i.e. the combination of short-circuit ring and supporting element, may also be centered on the shaft. In this context, it is advantageous if axial bores or through-holes are provided on the radially inner part of the supporting element, in order to enable air to flow in the region between supporting element and laminated core.

The supporting element in this context may be embodied in the shape of a spoked wheel, by an inner ring closing around the shaft and an outer ring supporting the short-circuit ring, connected to the inner ring via spokes.

In addition to its cage consisting of conductors and short-circuit rings, the cage rotor may also have permanent magnets in or on the magnetically conductive body, in particular the laminated core, in order to also be used in a line-start motor.

Due to it being possible to increase the rotational speed of the rotor according to the invention, it is possible to achieve an increase in the motor or generator output of an asynchronous machine.

According to the invention, a high integration of a cage rotor is now present, which has means for mechanical stabilization, cooling and conducting the electrical current with low losses.

In particular, a laminated construction of the rotor may also be retained. As a result, comparatively low rotor losses occur and there is an improved degree of efficiency compared to the solid embodiment of the magnetically conductive body.

Due to these measures, there is an increase in output of the asynchronous machine by increasing the maximum rotational speed. This is achieved while retaining other components of the active circuit, such as a stator, or passive components, such as the bearings of the asynchronous machine.

BRIEF DESCRIPTION OF THE DRAWING

The invention and further advantageous embodiments thereof will now be explained in greater detail on the basis of schematic representations of exemplary embodiments; In which:

FIG. 3 shows a partial longitudinal section of a cage rotor with supporting ring and disk, FIG. 4 shows a perspective representation of a cage rotor with supporting ring and disk in accordance with FIG. 3, FIG. 9 shows a cut-out of a top view of a cage rotor with claw star or strut, FIG. 10 shows a partial longitudinal section of a cage rotor inter alia with disk and strut.

DETAILED DESCRIPTION OF PREFERRED EMBODIMENTS

Figure 1:
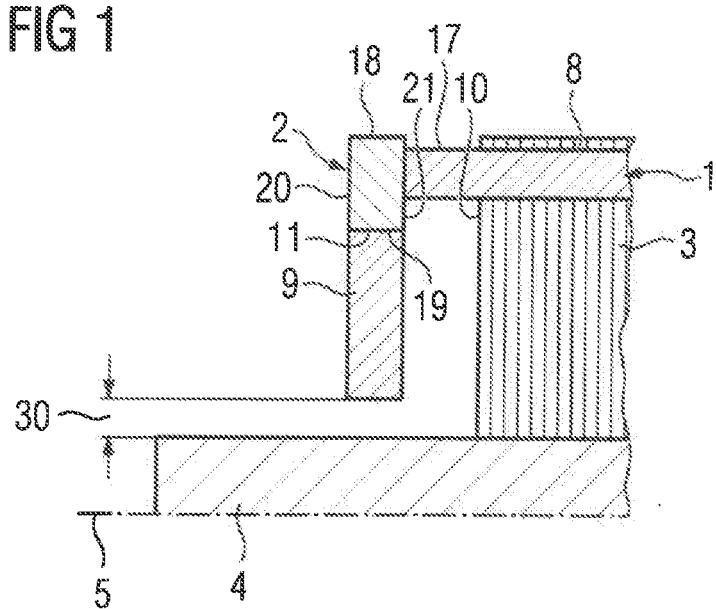
FIG. 1 shows a partial longitudinal section of a cage rotor with a supporting ring.

FIG. 1 shows, in a partial longitudinal section, a cage rotor 6 of an asynchronous machine 7, wherein arranged in a magnetically conductive body, embodied as solid or as a laminated core 3, in substantially axially running slots 8 are electrical conductors 1, in particular conductor bars, which are in each case electrically contacted with a short-circuit ring 2 at the end faces 10 of the laminated core 3. The laminated core 3 is connected to a shaft 4 in a rotationally fixed manner, and is mounted such that it can be rotated about an axis 5. Located in a non-magnetic or magnetic manner radially within the short-circuit ring 2 is a mechanically high-strength supporting ring 9, which at least in sections on its outer peripheral surface is connected to the inner side 19 of the short-circuit ring 2 with a material fit.

In principle, this material-fit connection can also be produced in the following embodiments by way of a HIP method, a welding method, a cold spraying method or other technologies.

Figure 2:
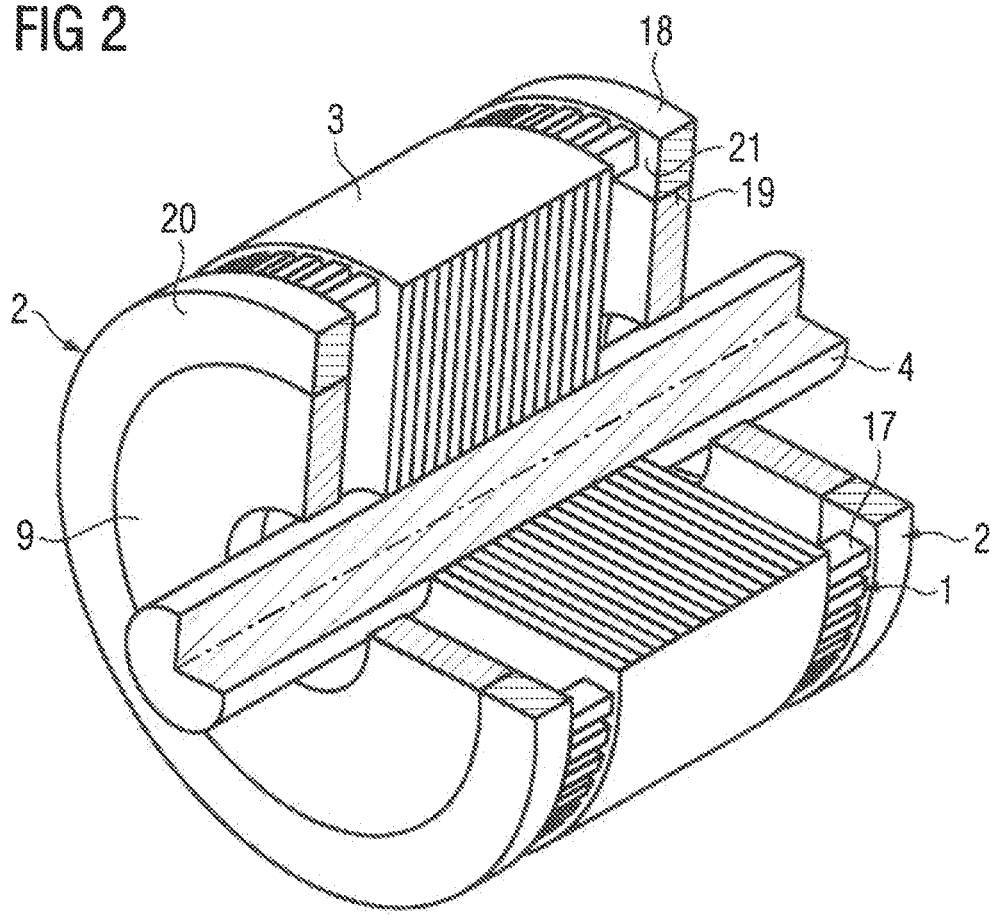
FIG. 2 shows a perspective representation of a cage rotor with supporting rings in accordance with FIG. 1.

FIG. 2 shows, in a perspective representation of this embodiment, how the short-circuit ring 2 is axially spaced apart from the laminated core 3 and thus ensures a cooling, in particular of the free conductor bar sections which protrude from the laminated core 3 and of the short-circuit ring 2. In this context, free conductor bar sections 17" refer to the axial sections of the conductor bar which protrude from the end face 10 of the laminated core 3 and are not located in the short-circuit ring 2.

In this embodiment, the supporting ring 9 has a spacing 30 from the shaft 4, so that inter alia the free conductor bar sections obtain a cooling air flow.

FIG. 3 shows, in a further embodiment, a supporting ring 9 radially within the short-circuit ring 2 and furthermore shows a radial extension of a shoulder, in particular a disk 12, in the direction of an air gap 16 (not shown in further detail) on a front side 20 of the short-circuit ring 2, which air gap also stabilizes and supports the short-circuit ring 2 on the front side 20 thereof with regard to centrifugal force loads. This disk 12 is likewise connected to the short-circuit ring 2 and/or the supporting ring 9 at least in sections with a material fit.

Both disk 12 and supporting ring 9 are interconnected with a material fit or are embodied in one piece. The outer radius of the disk 12 is not greater or is only slightly greater than the outer radius of the short-circuit ring 2. In any case, it should not protrude into the air gap 16.

In accordance with FIG. 4, this embodiment is shown in further detail in a perspective representation.

Supporting ring 9 and disk 12 may also be made of one element or material in one piece, contrary to the hatching of these parts in accordance with FIG. 3 and FIG. 4. A connection, having a material fit at least in sections, should accordingly then be provided between inner side 19 and the front side 20 of the short-circuit ring 2 and said element in one piece. The supporting ring 9 would therefore have a radially extending shoulder.

Figure 5:
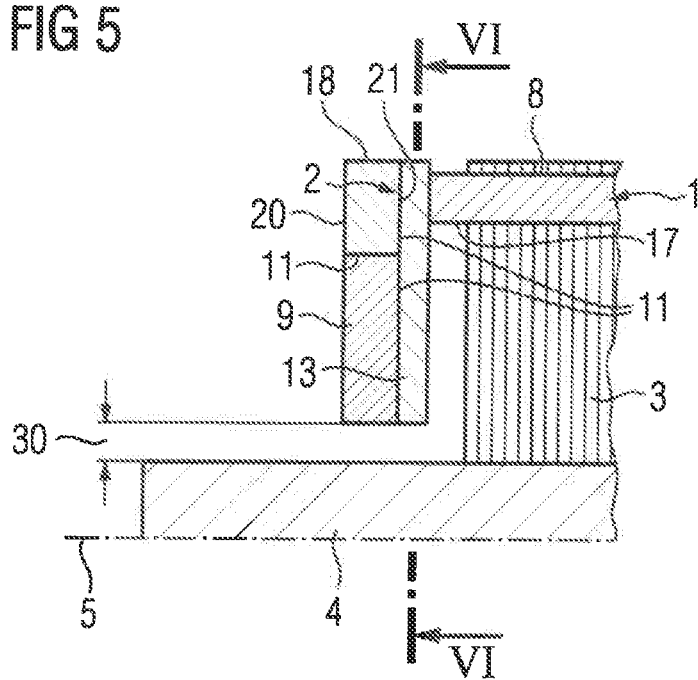
FIG. 5 shows a partial longitudinal section of a cage rotor with struts.

FIG. 5 shows, in a further embodiment, two rings: the short-circuit ring 2 on the one hand and the supporting ring 9 made of high-strength material lying radially further on the inside. Furthermore, there are struts 13 on the rear side 21 of the short-circuit ring 2, i.e. in the intermediate space between the short-circuit ring 2 and the end face 10 of the laminated core 3, wherein the individual struts 13 extend in the direction of the air gap 16 and thus additionally also support the short-circuit ring 2 with regard to centrifugal force loads, primarily in the high rotational speed range. These struts 13 are likewise connected to the short-circuit ring 2 and/or the supporting ring 9 at least in sections with a material fit.

Figure 6:
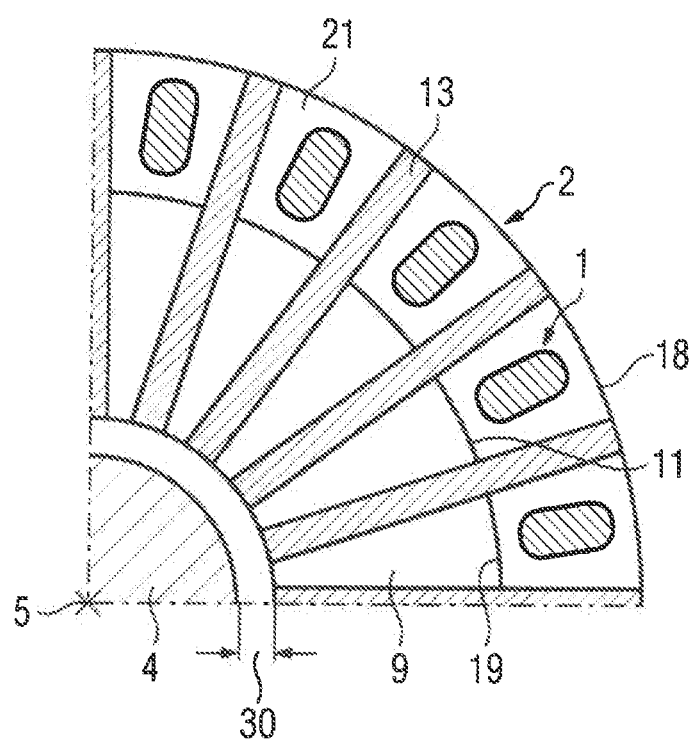
FIG. 6 shows a partial transverse section of a cage rotor in accordance with FIG. 5.

FIG. 6 shows this embodiment in a partial transverse section, wherein the individual struts 13 extend between the conductor bars 1 and at most reach the air gap 16.

Supporting ring 9 and struts 13 may also be made of one element or material in one piece, contrary to the hatching of these parts in accordance with FIG. 5 and FIG. 6. A connection, having a material fit at least in sections, should accordingly then be provided between inner side 19 and the rear side 21 of the short-circuit ring 2 and said element in one piece. The supporting ring 9 would therefore have radially extending struts 13.

Figure 7:
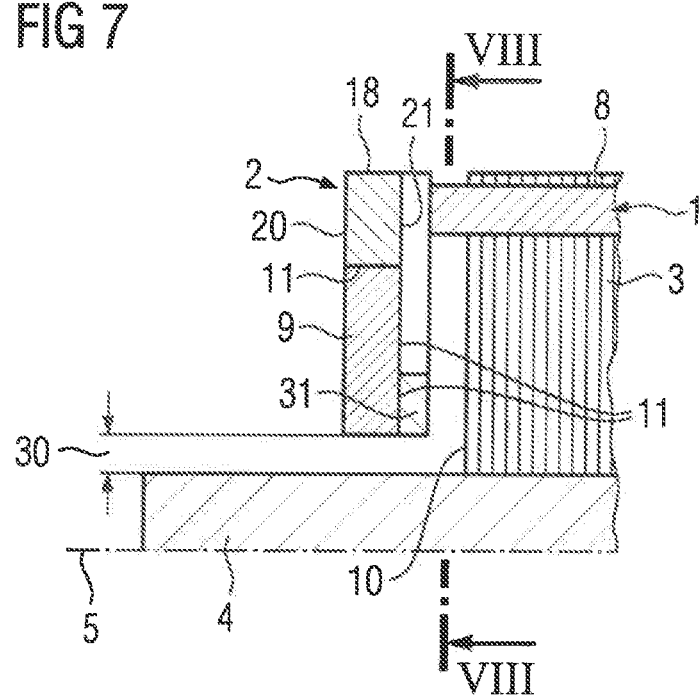
FIG. 7 shows a partial longitudinal section of a cage rotor with claw star.

FIG. 7 shows, in a further embodiment, three rings: the short-circuit ring 2 on the one hand, the supporting ring 9 made of high-strength material lying radially further on the inside and a ring that forms a claw star 31. In this context, the claw star 31 has a ring with radially extending claws. Furthermore, there are claws of the claw star 31 on the rear side 21 of the short-circuit ring 2, i.e. in the intermediate space between the short-circuit ring 2 and the end face 10 of the laminated core 3, wherein these individual claws extend in the direction of air gap 16 and thus additionally also support the short-circuit ring 2 with regard to centrifugal force loads, primarily in the high rotational speed range. This claw star 31 is likewise connected to the short-circuit ring 2 and/or the supporting ring 9 at least in sections with a material fit.

Figure 8:
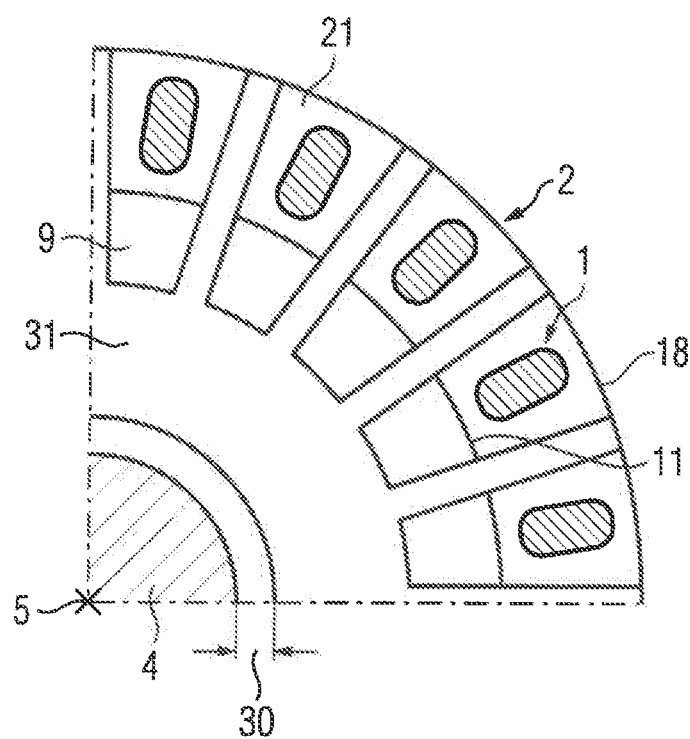
FIG. 8 shows a partial transverse section of a cage rotor in accordance with FIG. 7.

FIG. 8 shows this embodiment in a partial transverse section, wherein the individual claws extend between the conductor bars 1 and at most reach the air gap 16.

The supporting ring 9 and also the claw star 31 have a spacing 30 from the shaft 4, so that inter alia the free conductor bar sections 17 obtain a cooling air flow.

FIG. 9 shows, in a partial view, a cut-out of the cage rotor 6, wherein the short-circuit ring 2 is supported by the claw star 31 or struts 13, wherein the claws or struts 13 in each case extend between the conductor bars 1. In this embodiment, the claws or struts 13 do not touch the conductor bars and thus may contribute to the cooling, in particular of the conductor sections 17, by means of a cooling air flow.

The claws of the claw star 31 or the separate struts 13 are able to occupy the intermediate space between two adjacent conductor bars, the rear side of the short-circuit ring 2 and the end face 10 of the laminated core 3 in the axial and/or peripheral direction to a predefinable extent.

FIG. 10 shows a further embodiment, in which the short-circuit ring 2 is supported by the high-strength supporting ring 9 on the inner side 19 and axially on both sides by a claw star 31 (rear side 21) and by a disk 12 (front side 20). In order to nonetheless obtain a sufficient cooling in the intermediate space between end face 10 of the laminated core 3 and the rear side 21 of the short-circuit ring 2, in this embodiment a through-hole 14 is provided in the supporting ring 9 in the region of the shaft 4, meaning that cooling air is able to pass axially. The supporting ring 9 is thus constructed similarly to a spoked wheel in this case, for example.

In order to avoid possible imbalances of the cage rotor 6, the hybrid ring, i.e. the combination of short-circuit ring 2 and supporting elements 9, 31, 13, may also be centered on the shaft 4. However, this means that through-holes 14 should then be provided in the hybrid ring, in order to obtain sufficient cooling in the intermediate space between end face 10 of the laminated core 3 and the rear side 21 of the short-circuit ring 2.

The arrangement of the through-holes 14 may advantageously be associated with the balancing of the cage rotor 6.

In addition to the supporting ring 9, the short-circuit ring 2 may also be provided with two claw stars 31 on the front side 20 and on the rear side 21.

Figure 11:
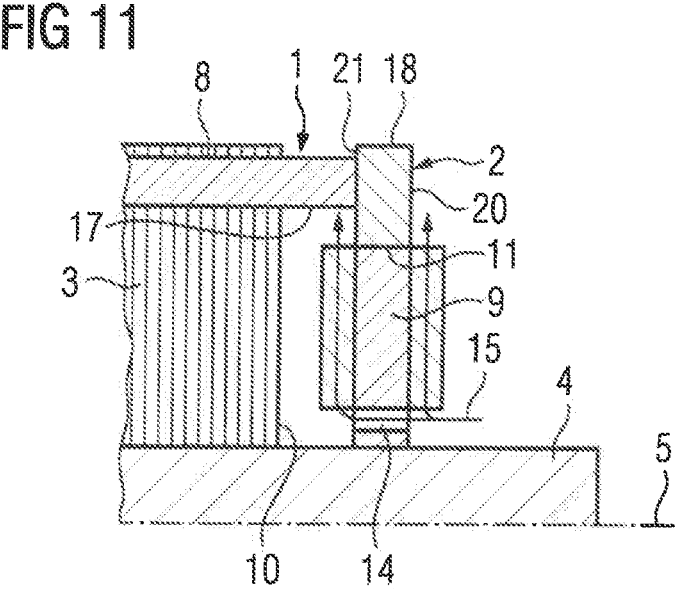
FIG. 11 shows a partial longitudinal section of a cage rotor inter alia with strut.

In accordance with FIG. 11, the supporting ring 9 is provided with through-holes 14. There, it is likewise conceivable to additionally provide radially shorter struts 13 on the front side 20 and rear side 21 of the short-circuit ring 2.

On the front side 20 and rear side 21 of the short-circuit ring 2, the supporting ring 9 may additionally also have two claw stars 31, with radially shorter claws. The supporting ring 9 is thus axially thicker than the short-circuit ring 2.

The supporting ring 9, the claw star 31 and the struts 13 are simply embodied as annular disk, as annular disk with rectangular claws when viewed in the cross-section and as rectangular struts when viewed in the cross-section, possibly with different radial lengths, as in FIG. 11 for example.

In order to obtain a shape of the elements stated above which is optimized in terms of strength, inertia or flow, these elements are for example embodied as rounded, curved, spoke-like or with different cross-sections over the course thereof.

In addition, the supporting ring 9 and/or the claw star 31 and/or the struts 13 may either be embodied in one piece and connected to the short-circuit ring 2 with a material fit, or connected to one another as individual elements and to the short-circuit ring 2 with a material fit.

Figure 12:
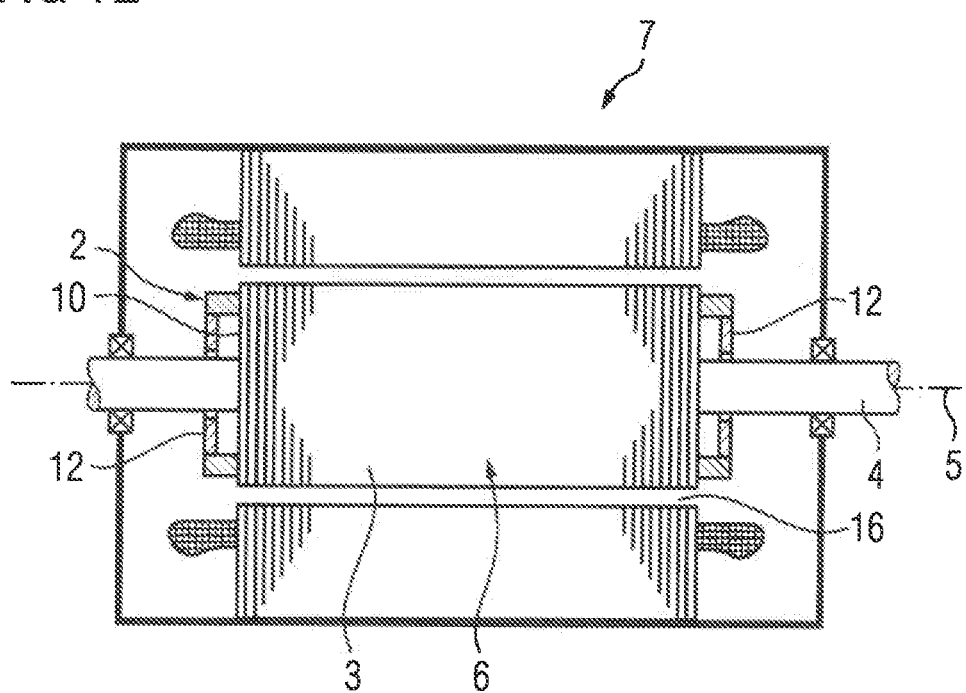
FIG. 12 shows a longitudinal cut-out of an asynchronous machine.

FIG. 12 shows a schematic asynchronous machine 7, in which all these embodiments can be implemented without problems, as these exemplary embodiments merely relate to the cage rotor 6 and other components, such as stator, housing, bearings etc., do not have to be altered. This leads to an increase in output of the overall asynchronous machine 7, meaning that in the case of applications in compressors, fans and in the field of drives, it is possible to achieve considerable increases in output due to higher rotational speeds.

In principle, the inventive idea can also be used in cage rotors 6 with a short-circuit ring 2, i.e. the rear side 21 of the short-circuit ring 2, in direct contact with the end face 10 of the laminated core 3 (FIG. 12). In this context, a supporting ring 9 is to be provided on the inner side 19 and, possibly additionally, a disk 12 or a claw star 31 or struts 13 are to be provided on the front side of the short-circuit ring 2.

Disk 12, claw star 31 or the struts 13 may also have an axial overlap, which is additionally able to absorb centrifugal forces of the short-circuit ring 2, on the outer side 18 of the short-circuit ring 2.

In principle, in all embodiments, in addition to the short-circuit ring 2 and the conductors 1, the cage rotor 6 may also contain permanent magnets, in order to be used as PM line-start motor. In this context, the motor is connected to the network directly and starts up asynchronously with the aid of the cage, i.e. via the short-circuit rings 2 and short-circuited conductors 1, at the synchronous rotational speed.

The invention claimed is:

1. A cage rotor of an asynchronous machine, comprising:
   a magnetically conductive body having end faces and substantially axially running slots;
   conductors received in the slots;
   a shaft connected to the magnetically conductive body:
   short-circuit rings arranged axially spaced apart from the end faces of the magnetically conductive body and connecting the conductors in an electrically conductive manner at the end faces of the magnetically conductive body, each said short-circuit ring having an outer side, an inner side, a front side, and a rear side;
   an intermediate space between each of the rear sides of the short-circuit rings and the end faces of the magnetically conductive body and
   a supporting element made of high-strength material and located at least radially within each short-circuit ring on the inner side, said supporting element connected to the short-circuit ring, at least in one section, with a material fit, said supporting element having additional elements in the intermediate space between the rear side of the short-circuit ring and the end face of the magnetically conductive body, with the additional elements and the short-circuit ring being connected, at least in one section, with a material fit, said additional elements being configured in a shape of a disk, claw or strut, said supporting element having a through-hole in a region of the shaft to enable passage of cooling air for cooling free conductor bar sections of the conductors.

2. The cage rotor of claim 1, wherein the magnetically conductive body is a laminated core.

3. The cage rotor of claim 1, wherein the short-circuit ring and the supporting element are centered on the shaft.

4. The cage rotor of claim 1, wherein the supporting element is embodied as a supporting ring.

5. The cage rotor of claim 1, wherein the supporting element is configured in a shape of a spoked wheel.

6. The cage rotor of claim 1, further comprising additional elements in a shape of a disk, claw or strut on the front side of the short circuit ring.

7. An asynchronous machine, comprising a cage rotor and constructed to achieve a rotational speed during operation of the asynchronous machine of greater than 5000 rpm, said cage rotor comprising a magnetically conductive body having end faces and substantially axially running slots, conductors received In the slots, a shaft connected to the magnetically conductive body, short-circuit rings arranged axially spaced apart from the end faces of the magnetically conductive body and connecting the conductors in an electrically conductive manner at the end faces of the magnetically conductive body, each said short-circuit ring having an outer side, an inner side, a front side, and a rear side, an intermediate space between each of the rear sides of the short-circuit rings and the end faces of the magnetically conductive body and a supporting element made of high-strength material and located at least radially within each short-circuit ring on the inner side, said supporting element connected to the short-circuit ring, at least in one section, with a material fit, said supporting element having additional elements in the intermediate space between the rear side of the short-circuit ring and the end face of the magnetically conductive body, with the additional elements and the short-circuit ring being connected, at least in one section, with a material fit, said additional elements being configured in a shape of a disk, claw or strut, said supporting element having a through-hole in a region of the shaft to enable passage of cooling air for cooling free conductor bar sections of the conductors.

8. The asynchronous machine of claim 7, constructed such that the rotational speed during operation of the asynchronous machine is greater than 8000 rpm.

9. The asynchronous machine of claim 7, wherein the magnetically conductive body of the cage rotor is a laminated core.

10. The asynchronous machine of claim 7, wherein the short-circuit ring and the supporting element of the cage rotor are centered on the shaft.

11. The asynchronous machine of claim 7, wherein the supporting element of the cage rotor is embodied as a supporting ring.

12. The asynchronous machine of claim 7, wherein the supporting element of the cage rotor is configured in a shape of a spoked wheel.

13. The asynchronous machine of claim 7 for use in a compressor, fan or vehicle drive.

14. The asynchronous machine of claim 7, further comprising additional elements in a shape of a disk, claw or strut on the front side of the short circuit ring.

* * * * *

UNITED STATES PATENT AND TRADEMARK OFFICE
CERTIFICATE OF CORRECTION

PATENT NO. : 12,374,958 B2  
APPLICATION NO. : 17/777426  
DATED : July 29, 2025  
INVENTOR(S) : Christian Bauer et al.

Page 1 of 1

It is certified that error appears in the above-identified patent and that said Letters Patent is hereby corrected as shown below:

On the Title Page

On Page 2, under item (56) FOREIGN PATENT DOCUMENTS:
Replace "EP 1 821 348 A2" with --EP 1 521 348 A2--;
Replace "RU 2366201 C2" with --RU 2386201 C2--; and
Replace "WO 2015-188885 A1" with --WO 2015-188985 A1--.

Signed and Sealed this  
Ninth Day of September, 2025

Coke Morgan Stewart  
*Acting Director of the United States Patent and Trademark Office*